United States Patent
Oxborrow

(10) Patent No.: US 9,608,396 B2
(45) Date of Patent: Mar. 28, 2017

(54) MASER ASSEMBLY

(71) Applicant: The Secretary of State for Business Innovation & Skills of Her Majesty's Britannic Government, London (GB)

(72) Inventor: Mark Oxborrow, Teddington (GB)

(73) Assignee: THE SECRETARY OF STATE FOR BUSINESS, INNOVATION AND SKILLS OF HER MAGESTY'S BRITANNIC GOVERNMENT, London (GB)

( * ) Notice: Subject to any disclaimer, the term of this patent is extended or adjusted under 35 U.S.C. 154(b) by 0 days.

(21) Appl. No.: 14/421,954

(22) PCT Filed: Aug. 15, 2013

(86) PCT No.: PCT/GB2013/052175
§ 371 (c)(1),
(2) Date: Feb. 16, 2015

(87) PCT Pub. No.: WO2014/027205
PCT Pub. Date: Feb. 20, 2014

(65) Prior Publication Data
US 2015/0214687 A1 Jul. 30, 2015

(30) Foreign Application Priority Data
Aug. 17, 2012 (GB) .................................. 1214720.3

(51) Int. Cl.
*H01S 1/02* (2006.01)
(52) U.S. Cl.
CPC ...................... *H01S 1/02* (2013.01)
(58) Field of Classification Search
CPC ............... H01S 1/00; H01S 1/02; H01S 1/005
(Continued)

(56) References Cited

U.S. PATENT DOCUMENTS

| 2,909,654 A | * | 10/1959 | Bloembergen | H01S 1/02 330/4 |
| 7,998,181 B2 | | 8/2011 | Nightengale et al. | |
| 2009/0315629 A1 | * | 12/2009 | Chindo | G04F 5/145 331/94.1 |

FOREIGN PATENT DOCUMENTS

| EP | 1437616 | 7/2004 |
| JP | 2008117890 | 5/2008 |

(Continued)

OTHER PUBLICATIONS

Mark Oxborrow, et al.: "Room-temperature solid-state maser", Nature, vol. 488, No. 7411, Aug. 15, 2012, pp. 353-356.
(Continued)

*Primary Examiner* — Jeffrey Shin
(74) *Attorney, Agent, or Firm* — Thomas | Horstemeyer, LLP

(57) ABSTRACT

A maser assembly includes a pump light source; a maser material including molecules that are excited through the absorption of light (1) from the pump light source, and which subsequently transfer via intersystem crossing (9) into the sublevels of their triplet ground states, so causing a population inversion between two sublevels (16,18); an electromagnetic structure in which the masing material is disposed, and which supports a microwave mode that is both resonant in frequency with and magnetically coupled to the transition between these two sublevels; and where energy is supplied to the microwave mode through stimulated emission (25) across the transition at such a rate as to exceed the mode's electromagnetic losses, the microwave mode being a maser mode. The assembly includes provisions for effecting substantially continuous maser activity during operation of the assembly. The laser crystal may be a (perdeuterated) pentacene in p-terphenyl which is held at room temperature without an additional magnetic field and the dye molecules (Continued)

in the single crystal may be pumped by blue LED with a frequency conversion to the yellow and green with the help of a Ce:YAG fluorescent pump light concentrator.

28 Claims, 5 Drawing Sheets

(58) Field of Classification Search
USPC .................................................... 331/3, 94.1
See application file for complete search history.

(56) References Cited

FOREIGN PATENT DOCUMENTS

| WO | 2012/0172365 A1 | 12/2012 |
| WO | WO2013/175235 A1 | 11/2013 |

OTHER PUBLICATIONS

J. Kohler et al: "On the intersystem crossing of pentacene in p-terphenyl", Chemical Physics Letters, vol. 250, No. 1, Feb. 1, 1996, pp. 137-144.
Shell J et al: "A 32-GHz reflected-wave maser amplifier with wide instantaneous bandwith", May 25, 1988, pp. 789-792.
International Search Report and Written Opinion, dated Apr. 2, 2014.
Buntkowsky, G., et al., "Nanosecond Time Resolution of Electron-Nuclear Cross Polarization Within the Optical Nuclear Polarization (ONP) Process", J. Phys,: Condense. Matter 3 (1991) 6093-6111, printed in UK.
Takeda, Kazuyuki, "Studies on Dynamic Nuclear Polarization Using Photo-Excited Triplet Electron Spins", located at URL: http://hdl.handle.net/2433/64950.
Jakob, Manuela, et al., Photoexcited State Properties of H2-Porphyrin/C60-Based Rotaxanes as Studied by Time-Resolved Electron Paramagnetic Resonance Spectroscopy, Journal of Phy. Chem. Apr. 2011, 115, pp. 5044-5052.
Kim, Soon Sam, et al., "Tran&Ent Magnetization in Photoexcitation of Phenazine and Itsheteroexcimer With Fluorene", Chemical Physics 27 (1978, pp. 21-26).
Lang, Jun, et al., "Orientational anisotropic studies by field rotation technique: Near zero-field pulsed EPR experiments of pentacene doped in p-terphenyl", Journal of Magnetic Resonance 176 (2005) pp. 249-256.
Levanon, Haim, et al., "Analysis of the transient EPR signals in the photoexcited triplet state. Application to porphyrin molecules", Journal of Chem. Phy., vol. 61, No. 6, Sep. 15, 1974, pp. 2265-2274.
Ong, Jui-Lin,et al., "Deuteration effect on the spin dynamics of the photo-excited triplet state of pentacene in p-terphenyl crystals", Chem Phy. Letters 241 (Aug. 4, 1995), pp. 540-546.
Yu, Hsiang-Lin, et al., "An electron spin echo study of the photoexcited triplet state of tetracene in p-terphenyl crystals at room temperature", Journ. Chem. Phy. 78(5) Mar. 1, 1983, pp. 2184-2188.
Blank, Aharon, et al., "Transparent miniature dielectric resonator for electron paramagnetic resonance experiments", Review of Scientific Instruments, vol. 74, No. 5, May 2003, pp. 2853-2859.
Clauss, Robert C., et al., Ruby Masers, Chapter 3, 2008, pp. 95-158.
Marina Brustolon, "Electron Paramagnetic Resonance—A Practiioner's Toolkit", Published by John Wiley & Sons, 2009, Chapter 2, pp. 37-44.
Iinuma, Masataka, et al., "Dynamic Nuclear Polarization at High Temperature for Polarized Proton Target", a dessertation submitted in partial fulfillment of requirements for a Doctor of Science Degree, located at URL: http://hdl.handle.net/2433/59302.
Reid, Macgregor S., "Low-Noise Systems in the Deep Space Network", Deep Space Communications and Navigation Series, 2008.
Siegman, A.E., "Microwave Solid-State Masers", McGraw-Hill Book Company, 1964, pp. 184, 253-257.
Sloop, David J., et al., "Electron spin echoes of a photoexcited triplet: Pentacene in p-terphenyl crystals", J. Chem. Phys. 75(8), Oct. 15, 1981, pp. 3746-3757.
Twig, Ygal, et al., "Sensitive surface loop-gap microresonators for electron spin resonance", Review of Scientific Instruments, 81, 104703-1 to 104703-11 (2010).

\* cited by examiner

MASER ASSEMBLY

CROSS-REFERENCE TO RELATED APPLICATION

This application is the 35 U.S.C. §371 national stage of, and claims priority to and the benefit of, PCT application PCT/GB2013/052175, filed Aug. 15, 2013, which claims priority to and the benefit of GB Application No. 1214720.3, filed on Aug. 17, 2012, herein incorporated by reference in their entireties.

FIELD OF THE INVENTION

The present invention relates to an optically pumped maser the gain medium of which is in a condensed phase of matter and where this maser is capable of being operated at room temperature, and in a closed scheme, without an applied d.c. magnetic field and on a continuous basis, in a preferred embodiment being pumped via a fluorescence concentrator pumped by one or more light emitting diodes.

BACKGROUND OF THE INVENTION

Masers (microwave amplification by stimulated emission of radiation), while spawning the laser, have had little commercial or practical success primarily as a result of the difficult operating conditions which have been required to achieve masing. Atomic and free-electron masers need bulky vacuum chambers and pumping apparatus. Solid-state masers, although being excellent amplifiers with extremely low noise figures, and used occasionally in ultra-stable oscillators, are required to be refrigerated to cryogenic temperatures to function. Most solid-state masers also require a strong magnetic field and magnetic shielding to function.

In the article entitled "Room-Temperature Solid-State Maser" by Mark Oxborrow, Jonathan Breeze and Neil Alford published in Nature on $16^{th}$ August 2012, henceforth referred to as RTSSM, there is described a structure of a maser which is able to exhibit maser activity at room temperature and without any additional magnetic field being applied to the maser crystal. The prototype maser used a crystal of p-terphenyl doped with pentacene at room temperatures, in air, in the earth's magnetic field, and amplified at around 1.45 GHz. The optical pumping mechanism of that prototype exploited spin-selective molecular intersystem crossing (ISC) into pentacene's triplet ground state. Configured as an oscillator, the measured power output of the prototype maser was around −10 dBm. This is approximately 100 million times greater than that of an atomic hydrogen maser, which oscillates nearby in frequency (~1.42 GHz). In contrast to the teachings herein, the gain medium of an atomic hydrogen maser is a rarefied, spin-polarized vapour of hydrogen atoms confined within an otherwise evacuated storage bulb. In RTSSM, it was stated that the millikelvin spin temperatures generated by means of the intersystem crossing of photo-excited pentacene could be used to realize an amplifier exhibiting 100 times lower noise that the quietest known room temperature microwave amplifier, though exactly how this could be achieved with the paper's prototype maser assembly was not described.

Notwithstanding these advances, the prototype maser reported in RTSSM was able to sustain masing for a period of 350 microseconds only, thus limiting the effectiveness of that maser assembly to only a few specific applications. It was found that applying either a longer or a more powerful optical pumping input to the pentacene-doped crystal of p-terphenyl would not substantially extend the duration of masing. It was also found that increasing the quality factor of the microwave mode that the prototype maser cavity supported, which would increase the same mode's magnetic Purcell factor, would also not substantially extend the duration of masing. This inevitable self-termination of the maser output was neither reported nor analyzed within RTSSM.

The inventor has since discovered that the cause of the self-termination observed with the maser assembly described in RTSSM in particular and a common and severe impediment to the realization of continuously working masers based on the spin-polarized triplet states of optically excited dye molecules more generally, is bottlenecking in the lower maser level. This bottlenecking is itself caused by this level having a decay lifetime out of the triplet state that is substantially longer than the decay lifetime of the upper maser level out of the same. In the case of the maser assembly described in RTSSM, it has been found that the Z sublevel of the triplet ground state of pentacene dissolved in p-terphenyl, where this sublevel served as the lower level of the maser transition, has a decay lifetime that is substantially longer than either the X or the Y sublevels of the same triplet ground state, where in the case of the prototype reported in RTSSM the X sublevel served as the upper level of the maser transition. This disparity of sublevel decay lifetimes causes an excess of the masing material's dye molecules to build up in the lower maser level, so destroying the population inversion generated by intersystem crossing, so terminating maser action. This self-termination due to bottlenecking in the lower maser level is analogous to the behaviour of the nitrogen laser, which is also intrinsically self-terminating. A rigorous, quantitative analysis of maser action in the prototype assembly considered in RTSSM is complicated by the fact that the rates of spin-lattice relaxation between the triplet ground state's three sub-levels are of a similar order of magnitude to the decay rates from these same sub-levels, leading to subtle effects.

In the case of pentacene-doped p-terphenyl at room temperature, albeit at high magnetic field, the substantial differences in the decay lifetimes of the different triplet sublevels are evident from Table II of Sloop, D. J., Yu, H.-L., Lin, T.-S. & Weissman, S. I. Electron spin echoes of a photo excited triplet: Pentacene in p-terphenyl crystals. J. Chem. Phys. 75, 3746-3757 (1981). Here, the value of $k_0$, which is the rate of decay from the Z sublevel of pentacene's triplet ground state, is more than a factor of 10 smaller than the values of $k_1$ and $k_{-1}$, which correspond to the decay rate of linear combinations of the X and Y sublevels at zero applied d.c. magnetic field. These same authors observed intriguing "inversions" in their experimental data, where the amplitude of a spin echo as a function of time since the firing of an optical pump pulse from a laser would change its sign from positive to negative (or vice versa) at a time of several tens of microseconds after the laser had fired. These inversions evidenced a complex interplay between spin-lattice relaxation versus decay in the removing of differences in the populations of the triplet ground state's sublevels.

Building upon these observations, there are described below methods whereby the problem of bottlenecking in the lower maser level can be either avoided in the first place or remedied.

The inventor has also identified a certain characteristic in the Jablonski energy-level schemes of certain dye molecules that, if exhibited by a candidate maser material, make the material particularly advantageous for masing. This characteristic is explained below.

As its source of required optical pump light, the maser assembly reported in RTSSM used a pulsed dye laser which, by dint of its bulk and low wall-plug efficiency, further limited the effectiveness of this maser assembly with respect to applications. There is taught herein a different and advantageous pump light source based on the principle of fluorescent concentration, which supplies an efficient means of boosting the luminance of a light source, which no system of geometric optics (such as mirrors or lenses) can do.

A quantitative analysis of the noise performance of maser amplifiers has been provided by Clauss, R. C. & Shell, J. S. in Low-Noise Systems in the Deep Space Network (ed. Reid, M. S., JPL, Caltech, 2008), which itself draws upon fundamental formulae derived from first principles in Siegman, A. E., Microwave Solid-state Masers (McGraw-Hill, 1964). Some re-interpretation of the variables used in Clauss and Shell's analysis, as was set up for the analysis of travelling-wave masers, is needed for it to be applicable to cavity masers such as RTSSM's prototype. Assuming the gain of the maser amplifier is high (which can generally be achieved with a cavity maser by trading off against bandwidth) and that the maser does operate well above threshold, the maser's residual noise temperature is given by (the following expression is based on equation 3.5-6 of the Clauss and Shell's article):

$$T_{ampl.}^{resid.} \approx \frac{T_0}{\eta} + \frac{hf_{mas.}}{k}\frac{r}{r-1}, \tag{0}$$

where $T_0$ is temperature of the maser's resonator (i.e. the temperature of its ohmically conductive walls and/or lossy dielectric materials within it), $\eta \equiv Q_0/Q_m$ is a dimensionless ratio quantifying the degree to which the gain of the maser's amplifying material exceeds the resonator's losses (maser threshold corresponds to $\eta=1$), $Q_0$ is the resonator's intrinsic (unloaded) Q or quality factor, $Q_m$ is the maser's magnetic Q (see Seigman), h is Planck's constant, $f_{mas.}$ is the maser's operating centre frequency, k is Boltzmann's constant and $r \equiv N_{upper}/N_{lower}$ is the spin population ratio between the upper and lower maser levels. The above equation (0) becomes more complicated for modest $\eta$ (see Clauss and Shell) but this added complexity does not affect the basic points concerning trends and scalings made here. According to equation (0), even if the maser operates at room temperature, i.e. if $T_0 \approx 293$ K, the reduced temperature $T_0/\eta$ can still be small if, and only if, the maser is operated far above threshold, i.e. if $\eta \gg 1$.

The previous paragraph and its mathematics can be summed up heuristically in words as follows. For the maser amplification process to be low-noise as a whole, the "quiet", quantum microwave gain provided by cold stimulated emission is required to overwhelm the "noisy" loss caused by dissipative processes in the room-temperature dielectrics and metal surfaces of the microwave resonator. Provided its right-most term on its right hand side is small, equation (0) above indicates that a maser amplifier's residual noise temperature drops approximately linearly with the multiple by which maser threshold is exceeded, i.e. linearly with $\eta$. In certain ultra-low noise applications, a multiple of $\eta \geq 100$ would be advantageous. In the experiment reported in RTSSM, the pulsed dye laser exceeded threshold by a factor $\eta \approx 7$, and only then for a few hundred microseconds as noted above. To exceed threshold continuously by large margins, which, as the above analysis demonstrates, is advantageous with respect to achieving low-noise amplification, compels the informed search and optimization of maser assemblies substantially different to that described in RTSSM.

SUMMARY OF THE PRESENT INVENTION

The present invention seeks to provide an improved maser and in particular a maser able to operate at room temperature with no additional applied magnetic field and which is able to operate on a substantially continuous basis. In particular, the present invention advantageously seeks to provide an improved optically-pumped condensed-matter maser capable of being operated at room temperature, in a closed scheme, without an applied d.c. magnetic field and on a continuous basis, in a preferred embodiment being pumped via a fluorescence concentrator by one or more light emitting diodes. Advantageously, the maser is able to operate in the earth's magnetic field.

According to an aspect of the present invention, there is provided a maser assembly including:
  a pump light source;
  a maser material including molecules that are excited through the absorption of light from the pump light source, and which subsequently transfer via intersystem crossing (ISC) into the sublevels of their triplet ground states, so causing a population inversion between two sublevels of same;
  an electromagnetic structure in which the masing material is disposed, and which supports a microwave mode that is both resonant in frequency with and magnetically coupled to the transition between these two sublevels;
  and where energy is supplied to the microwave mode through stimulated emission across the transition at such a rate as to exceed the mode's electromagnetic losses, the microwave mode being a maser mode;
  where the maser assembly is characterized by satisfying $$\eta \equiv \frac{1}{2}P_{opt.}\kappa_{opt}\Theta_{ISC}^{eff.}\frac{f_{mas.}}{f_{opt.}}T_1^{eff.}T_2^{mas.}\gamma^2\sigma_{mas.}^2\Lambda^2 > 1, \tag{1}$$

where $$T_1^{eff.} \equiv \frac{\begin{bmatrix} p_U^{ISC}\{1+\tau_U[1/\tau_A+1/\tau_L+T_1^{rep.}/(\tau_A\ \tau_L)]\} - \\ p_L^{ISC}T_1^{rep.}\{1/\tau_A+1/T_1^{idl.}[1+\tau_U(1/\tau_A+1/\tau_L)]\} + \\ (\tau_U/\tau_L)(T_1^{rep.}/T_1^{idl.})-1 \end{bmatrix}}{\begin{bmatrix} (1/\tau_A+1/\tau_L)+(1/T_1^{idl.}+1/T_1^{mas.})+ \\ \tau_U(1/T_1^{idl.}+1/T_1^{mas.})(1/\tau_A+1/\tau_L)+ \\ T_1^{rep.}\{(1/\tau_A+1/T_1^{idl.})(1/\tau_L+1/T_1^{mas.})+ \\ T_U[1/(\tau_A\ \tau_L)(1/T_1^{idl.}+1/T_1^{mas.})+ \\ 1/(T_1^{idl.}\ T_1^{mas.})(1/\tau_A+1/\tau_L)]\} \end{bmatrix}}, \tag{2}$$

In equation (1): $P_{opt.}$ is the optical power of the light supplied by the pump light source and $\kappa_{opt.}$ is the overall optical efficiency associated with the conveyance into and subsequent absorption by the maser material of light from the pump light source; $\Theta_{ISC}^{eff.} \equiv \theta_{IC}^S\Theta_{ISC}\theta_{IC}^T$, where $\theta_{IC}^S$ is the probability of a dye molecule, upon being photo excited by the pump light into one or other of its excited singlet states, arriving at the lowest excited singlet state $S_1$; $\Theta_{ISC}$ is the intersystem-crossing (ISC) yield, $\theta_{IC}^T$ is the probability of the maser material reaching $T_1$; $f_{opt.}=c/\lambda$, is the frequency of the pump light (c is the speed of light in a vacuum) where $\lambda$ is the vacuum wavelength of the same; $f_{mas.}$ is the frequency of the maser transition; $\Delta f_{mas.} \equiv 1/(\pi T_2^{mas.})$ is the characteristic line width of the maser transition; $\gamma \equiv -g_J\mu_B/\hbar$ is the inverse gyromagnetic ratio; $\Lambda \equiv \sqrt{\mu_0 Q_{mas.}^{loaded}/(\pi f_{mas.} V_{mas.}^{mag.})}$ is the so-called field-power conversion ratio/factor or, synonymously, the (resonator) efficiency parameter; and $V_{mas.}^{mag.}$ is the magnetic mode volume of same; $\sigma_{mas.}^2$ is the effective normalized transition probability matrix element squared for stimulated emission of the maser transition.

In equation (2), concerning the variables appearing in the definition of the effective relaxation time $T_1^{eff.}$: $p_L^{ISC}$, $p_U^{ISC}$ denote the normalized population rates into the lower and upper maser levels within the molecules triplet ground state as mediated by intersystem crossing, respectively; $\tau_L$, $\tau_U$ denote the decay rate from the lower and upper maser levels within the molecules triplet ground state, and $\tau_A$ denotes the decay rate from the remaining sublevel of the triplet state's three or auxiliary sublevel; $T_1^{mas.}$ denotes the spin-lattice relaxation time of the maser transition; $T_1^{rep.}$ denotes the spin-lattice relaxation time of the transition that connects the lower maser level to the auxiliary level, hereinafter referred to as the repumper transition; $T_1^{idl.}$ denotes the spin-lattice relaxation time of the idler transition that connects the upper maser level to the auxiliary level.

In the preferred embodiment the pump light source includes an optical guide for conveying this light to the maser material.

It is preferred that the maser material is a substance containing dye molecules ordinarily in their ground states which are excited through the absorption of light (from the pump light source) and which subsequently transfer via intersystem crossing (ISC) into the sublevels of the molecules' triplet ground state. Such ISC-mediated transfer is operable to provide a population inversion across two of the sublevels.

Advantageously, the electromagnetic structure, which supports the microwave mode, is such that electromagnetic energy in this microwave mode can be amplified through stimulated emission across this transition. This transition is referred to herein as the maser transition. The transition's upper sublevel is referred to herein as the upper level of the maser transition, and the transition's lower sublevel is referred to herein as the lower level of the maser transition. The microwave mode is referred to herein as the maser mode.

According to another aspect of the present invention, there is provided a maser assembly including:
  a pump light source;
  a maser material including molecules that are excited through the absorption of light from the pump light source, and which subsequently transfer via intersystem crossing (ISC) into the sublevels of their triplet ground states, so causing a population inversion between two sublevels of same;
  an electromagnetic structure in which the masing material is disposed, and which supports a microwave mode that is both resonant in frequency with and magnetically coupled to the transition between these two sublevels;
  and where energy is supplied to the microwave mode through stimulated emission across the transition at such a rate as to exceed the mode's electromagnetic losses, the microwave mode being a maser mode;
  wherein the maser material is characterized by having or including molecules which are completely or partially deuterated.

In the preferred embodiment the maser material includes dye molecules. The dye molecules may be either completely or partially deuterated, or molecules composing a material host medium in which the dye molecules are dissolved are either completely or partially deuterated, or both. The term "deuteration" is used herein refer to a material in which hydrogen atoms are replaced by deuterium atoms.

The inventor has found that the deuteration of the dye and/or the host molecules can substantially change the lifetimes of the sublevels of the dye molecules' triplet state, where the changes can be sufficient either to avoid the problem of bottlenecking all together, or to substantially alleviate it.

Furthermore, deuteration can make the value $T_1^{eff.}$ large enough for inequality (1) to be achieved, i.e. for above-threshold maser action to be made possible, for realistic values of the other parameters.

With some materials treatment by substitution with deuterium is sufficient for enabling continuous masing, although it is preferred that this is combined with repumping as explained below.

In some embodiments only a particular subset of the hydrogen atoms in a dye and/or host molecules within the masing material are replaced with deuterium, but in other embodiments all of the hydrogen atoms are replaced.

Where deuterated versions of dye and host molecules are not readily available, the other advances taught herein can provide a system and method which avoids bottlenecking.

It is envisaged that in place of or in addition to deuteration, the maser material could be treated with tritium; that is the dye or other maser material molecules may either have their hydrogen atoms completely or partially replaced with tritium or molecules composing a material host medium in which the maser molecules are dissolved have their hydrogen atoms either completely or partially replaced with tritium, or both.

According to another aspect of the present invention, there is provided a maser assembly including:
  a pump light source;
  a maser material including molecules that are excited through the absorption of light from the pump light source, and which subsequently transfer via intersystem crossing (ISC) into the sublevels of their triplet ground states, so causing a population inversion between two sublevels of same;
  an electromagnetic structure in which the masing material is disposed, and which supports a microwave mode that is both resonant in frequency with and magnetically coupled to the transition between these two sublevels;
  and where energy is supplied to the microwave mode through stimulated emission across the transition at such a rate as to exceed the mode's electromagnetic losses, the microwave mode being a maser mode;
  characterised by a second microwave mode, supported by the electromagnetic structure, where this second microwave mode is operable to transfer molecules from the lower maser level of the triplet ground state to the auxiliary level of same, where decay out of the triplet ground state $T_1$ back to the singlet ground state $S_0$ from the auxiliary level is substantially more rapid than decay from the lower maser level back to same.

This second microwave mode can conveniently be referred to as a repumper mode.

According to another aspect of the present invention, there is provided a maser assembly including:
  a pump light source;
  a maser material including molecules that are excited through the absorption of light from the pump light source, and which subsequently transfer via intersystem crossing (ISC) into the sublevels of their triplet ground states, so causing a population inversion between two sublevels of same;

an electromagnetic structure in which the masing material is disposed, and which supports a microwave mode that is both resonant in frequency with and magnetically coupled to the transition between these two sublevels;

and where energy is supplied to the microwave mode through stimulated emission across the transition at such a rate as to exceed the mode's electromagnetic losses, the microwave mode being a maser mode;

characterised in that the first excited singlet state of molecules within the maser material are approximately resonant in energy with one of the same molecules' excited triplet states.

This aspect can ensure that the value of that intersystem crossing yield $\Theta_{ISC}$ is large, so making it easier to both attain and exceed maser threshold.

It has been observed by experts in the field of optically excited dye molecules that the effective intersystem crossing yield, that is the probability of a dye molecule transferring over, upon optical excitation, into its triplet ground state can vary enormously from one masing material to another. It is known, for example, that a terrylene dye molecule when dissolved in crystalline p-terphenyl exhibits an extremely low ISC yield, so favouring this system for studies of single molecule fluorescence spectroscopy whilst disfavouring it for the making of the sorts of masers described herein. The inventor has discovered, though, that resonant alignment in energy between the first-excited or higher singlet state of dye molecules, $S_{n\geq 1}$, where n is an integer, and a triplet state of the same is characteristic of a subset of masing materials that are particularly advantageous for masing in that this resonant alignment ensures a high value for $\Theta_{ISC}$. Modern quantum chemistry design packages based on Kohn-Sham density functional theory (DFT), enable such fortuitous coincidences between $S_{n\geq 1}$ and triplet states in the energy level diagrams of candidate dye molecules to be systematically searched for and spotted among different candidate dye:host molecular systems.

According to another aspect of the present invention, there is provided a maser assembly including:

a pump light source;

a maser material including molecules that are excited through the absorption of light from the pump light source, and which subsequently transfer via intersystem crossing (ISC) into the sublevels of their triplet ground states, so causing a population inversion between two sublevels of same;

an electromagnetic structure in which the masing material is disposed, and which supports a microwave mode that is both resonant in frequency with and magnetically coupled to the transition between these two sublevels;

and where energy is supplied to the microwave mode through stimulated emission across the transition at such a rate as to exceed the mode's electromagnetic losses, the microwave mode being a maser mode;

characterized by in that the pump light source includes a fluorescence concentrator.

Preferably, the fluorescing material of the fluorescence concentrator is pumped with light from an efficient primary light source, such as one or several light-emitting diodes, and wherein in preferred embodiments the spectral profile of the light generated by the process of fluorescence within the concentrator is well matched to the optical absorption spectrum of the dye molecule within the masing material. Advantageously, the pump light generated by the concentrator is conveyed to the maser material without substantial loss by an optical waveguide.

In one particular preferred embodiment of the pump light source assembly, the efficient primary light source is a bank of InAlN-based LEDs emitting royal blue light at around 460 nm, the fluorescence concentrator is a prismatic rod of cerium-doped YAG crystal, and the wave guide is a prismatic rod of undoped YAG crystal of the shape cross-section, where one end of the Ce:YAG rod is optically coupled to one end of the undoped YAG rod.

The inventor has found that pump light source assemblies incorporating fluorescence concentrators are capable of providing pump light to the masing material at advantageous wavelengths, and at advantageous levels of both optical power and optical intensity (i.e. luminance), and at advantageous overall wall-plug efficiencies. By using such pump light source assemblies, the output power of the pump light source can be made high, and the prismatic form of the concentrator (and its non-fluorescing waveguide extensions) provides an efficient optical guiding means for conveying the concentrator's output power to the masing material while maintaining the concentrator's high output luminance, which permits the use of advantageously compact maser modes exhibiting high conversion factors. All in all, for the above reasons, the use of fluorescence concentrators is advantageous with respect to satisfying inequality (1) in a resource-efficient manner.

It will be appreciated that the fluorescent concentrator can ensure that the value of the power of the pump light source $P_{opt.}$ in equations (1) is large, so making it easier to both attain and exceed maser threshold.

According to another aspect of the present invention, there is provided a maser assembly including:

a pump light source;

a maser material including molecules that are excited through the absorption of light from the pump light source, and which subsequently transfer via intersystem crossing (ISC) into the sublevels of their triplet ground states, so causing a population inversion between two sublevels of same;

an electromagnetic structure in which the masing material is disposed, and which supports a microwave mode that is both resonant in frequency with and magnetically coupled to the transition between these two sublevels;

and where energy is supplied to the microwave mode through stimulated emission across the transition at such a rate as to exceed the mode's electromagnetic losses, the microwave mode being a maser mode;

characterized in that the electromagnetic structure includes:

a cavity with a single port connected to a circulator whose two other ports are the amplifier's input and output;

a cavity with two ports, advantageously incorporating a low-noise isolator on its output port directed away from the assembly, the other port being the input port; or a slow-wave transmission line with input and output couplers and advantageously incorporating several low-noise isolators distributed through the line and directed towards an output of the amplifier.

According to another aspect of the present invention, there is provided a maser assembly including:

a pump light source;

a maser material including molecules that are excited through the absorption of light from the pump light source, and which subsequently transfer via intersystem crossing (ISC) into the sublevels of their triplet ground states, so causing a population inversion between two sublevels of same;

an electromagnetic structure in which the masing material is disposed, and which supports a microwave mode that is both resonant in frequency with and magnetically coupled to the transition between these two sublevels;

and where energy is supplied to the microwave mode through stimulated emission across the transition at such a rate as to exceed the mode's electromagnetic losses, the microwave mode being a maser mode;

characterized in that the assembly is operable at near room temperature and exhibits η>>1, where residual amplification noise temperature of the assembly lies substantially below room temperature.

According to another aspect of the present invention, there is provided a maser assembly including:

a pump light source;

a maser material including molecules that are excited through the absorption of light from the pump light source, and which subsequently transfer via intersystem crossing (ISC) into the sublevels of their triplet ground states, so causing a population inversion between two sublevels of same;

an electromagnetic structure in which the masing material is disposed, and which supports a microwave mode that is both resonant in frequency with and magnetically coupled to the transition between these two sublevels;

and where energy is supplied to the microwave mode through stimulated emission across the transition at such a rate as to exceed the mode's electromagnetic losses, the microwave mode being a maser mode;

characterized in that the continuously oscillating maser exhibits extremely low phase noise.

According to another aspect of the present invention, there is provided a maser assembly including:

a pump light source;

a maser material including molecules that are excited through the absorption of light from the pump light source, and which subsequently transfer via intersystem crossing (ISC) into the sublevels of their triplet ground states, so causing a population inversion between two sublevels of same;

an electromagnetic structure in which the masing material is disposed, and which supports a microwave mode that is both resonant in frequency with and magnetically coupled to the transition between these two sublevels;

and where energy is supplied to the microwave mode through stimulated emission across the transition at such a rate as to exceed the mode's electromagnetic losses, the microwave mode being a maser mode;

characterized by a maser material in which quenching molecules are dissolved, where the function of these included molecules is to reduce or otherwise advantageously modify the lifetimes of the sublevels of the triplet grounds states of dye molecules such that bottlenecking is avoided or at least mitigated.

DEFINITIONS

In the same way as the term is used in the art of physics, the term "condensed-matter" is used herein to describe a device whose active medium is in a solid, liquid or glassy state as opposed to a device, like an atomic hydrogen maser, whose active medium is in a gaseous state.

As used herein, a maser scheme is said to be closed if the quantum entities that participate in the masing process are returned to their original states upon a complete loop of the scheme. A closed maser scheme thus has the advantage of being able to recycle the quantum entities thus the whole masing material. Such a maser does not require supplies of fresh material nor does it require a means of disposing of spent material. Spent hydrogen atoms in a regular hydrogen maser are necessarily disposed of through suction with a vacuum pump.

DESCRIPTION OF THE DRAWINGS

Embodiments of the present invention are described below, by way of example only, with reference to the accompanying drawings, in which.

DESCRIPTION OF THE PREFERRED EMBODIMENTS

Figure 1:
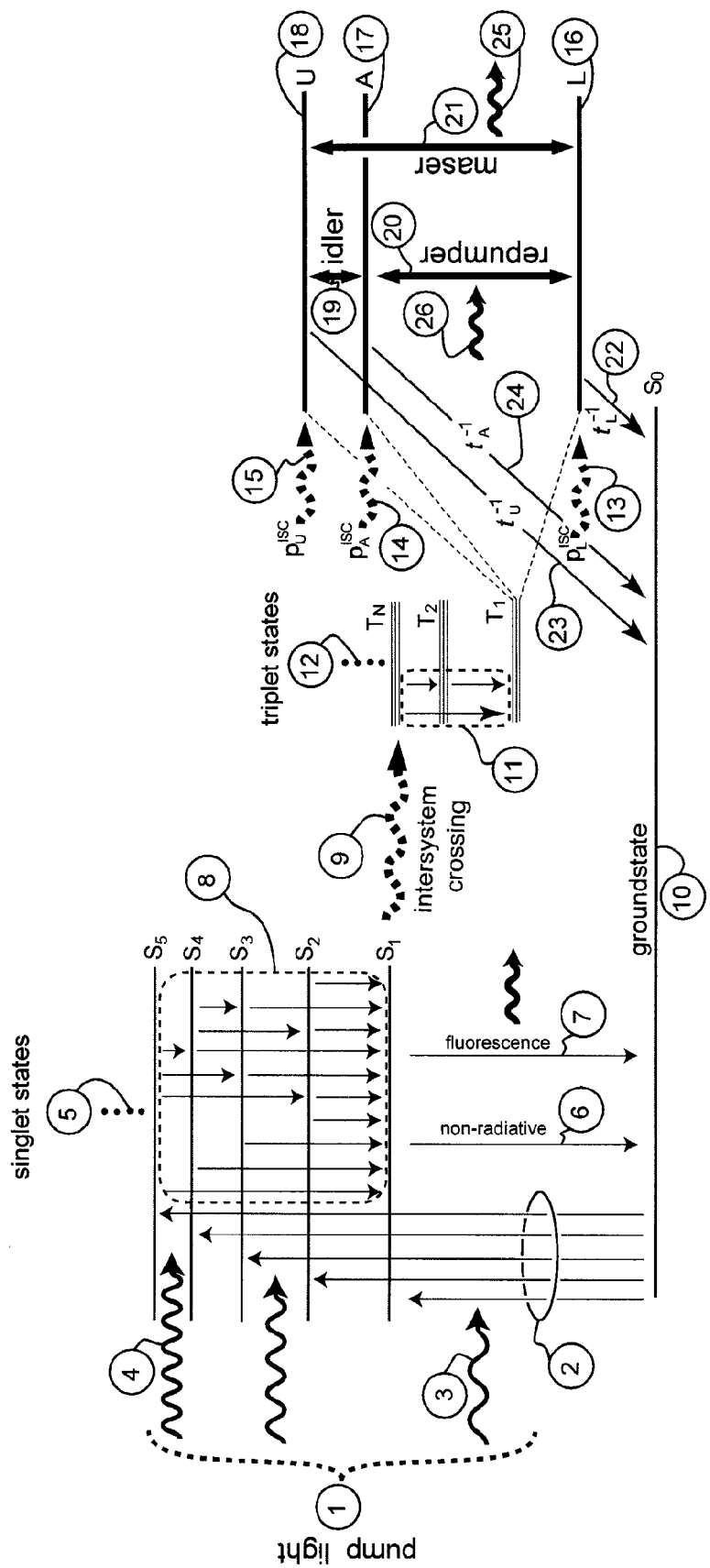
FIG. 1 is a general Jablonski energy-level diagram for an embodiment of the maser scheme.

The preferred embodiments disclosed below are directed to a maser assembly which includes a pump light source. If the pump light source is a laser and the assembly's electromagnetic supporting structure provides a transparent access path, the masing material many be optically pumped by directing the laser's output beam onto the masing material. Otherwise, the maser assembly requires a optical guide, such as a light pipe to convey the pump light source's output into the masing material. The dye molecules are excited through the absorption of light from the pump light source and which subsequently transfer via intersystem crossing (ISC) into the sublevels of the molecules' triplet ground state. The ISC-mediated transfer is operable to provide a population inversion across two of these sublevels.

The apparatus also includes an electromagnetic structure in which the masing material is disposed. The structure supports a microwave mode that is both resonant in frequency with and magnetically coupled to the transition between this population-inverted pair of sublevels. Electromagnetic energy in this microwave mode can be amplified through stimulated emission across this transition; which is referred to herein as the maser transition. This transition's upper sublevel will be referred to henceforth as the upper level of the maser transition, while the transition's lower sublevel will be referred to as the lower level of the maser transition. The microwave mode will be referred to henceforth as the maser mode.

The assembly satisfies the following criteria:

$$\eta \equiv \frac{1}{2} P_{opt.} \kappa_{opt.} \Theta_{ISC}^{eff.} \frac{f_{mas.}}{f_{opt.}} T_1^{eff.} T_2^{mas.} \gamma^2 \sigma_{mas.}^2 \Lambda^2 > 1, \quad (1)$$

where

-continued $$T_1^{\text{eff.}} \equiv \frac{\begin{bmatrix} p_U^{ISC}\{1 + \tau_U[1/\tau_A + 1/\tau_L + T_1^{\text{rep.}}/(\tau_A \tau_L)]\} - \\ p_L^{ISC} T_1^{\text{rep.}}\{1/\tau_A + 1/T_1^{\text{idl.}}[1 + \tau_U(1/\tau_A + 1/\tau_L)]\} + \\ (\tau_U/\tau_L)(T_1^{\text{rep.}}/T_1^{\text{idl.}}) - 1 \end{bmatrix}}{\begin{bmatrix} (1/\tau_A + 1/\tau_L) + (1/T_1^{\text{idl.}} + 1/T_1^{\text{mas.}}) + \\ \tau_U(1/T_1^{\text{idl.}} + 1/T_1^{\text{mas.}})(1/\tau_A + 1/\tau_L) + \\ T_1^{\text{rep.}}\{(1/\tau_A + 1/T_1^{\text{idl.}})(1/\tau_L + 1/T_1^{\text{mas.}}) + \\ T_U[1/(\tau_A \tau_L)(1/T_1^{\text{idl.}} + 1/T_1^{\text{mas.}}) + \\ 1/(T_1^{\text{idl.}} T_1^{\text{mas.}})(1/\tau_A + 1/\tau_L)]\} \end{bmatrix}}, \quad (2)$$

The three sublevels of the triplet state may be given the labels: U(pper), L(ower) and A(uxiliary). Each of these three sublevels has associated with it a normalized population rate $p^{ISC}$ and a normalized decay rate $\tau$. There are three possible transitions between the three sublevels of the triplet state. These have been given the labels: Mas(er), Rep(umper), and Idl(er). Each of these transitions is characterized by its spin-lattice relaxation time $T^{\text{rep.}}$. The asymmetry in equation (2) comes from selecting one of the three intra-triplet transitions to be the maser transition.

In equation (1): $P_{opt.}$ is the optical power of the light supplied by the pump light source and $\kappa_{opt.}$ is the overall optical efficiency associated with the conveyance into and subsequent absorption by the masing material of this light, taking into account that the optical absorption cross section of a dye molecule will generally depend on both the wavelength of the pump light as well as on how the dye molecule is oriented with respect to both the direction of travel and polarization of same, and also taking into account the optical losses from light passing straight through the masering material without being absorbed due to the masing material being too thin and/or disadvantageously oriented, and taking into account the losses from light being scattered away from or out of the material due to reflections at its surfaces or reflections from optical flaws/inhomogeneities within the material.

$\Theta_{ISC}^{\text{eff.}} \equiv \theta_{IC}^S \Theta_{ISC} \theta_{IC}^T$, where $\theta_{IC}^S$ is the probability of a dye molecule, upon being photo excited by the pump light into one or other of its singlet states, arriving at the lowest singlet state $S_1$ by either internally converting from a higher state $S_N$, where $N \geq 2$, into which it was photo-excited or arriving at $S_1$ by photo excitation directly. According to Kasha's law, $\theta_{IC}^S$ will generally be only very slightly less than unity, i.e. easily greater than 0.9. $\Theta_{ISC}$ is the intersystem-crossing (ISC) yield, i.e. the probability of the molecule transferring from $S_1$ by intersystem crossing into a triplet state. $\theta_{IC}^T$ is the probability of the dye molecule either internally converting from whatever triplet state it gets deposited into via ISC down into the triplet ground state $T_1$ or it arriving at $T_1$ via ISC directly. Again, by the triplet-state extension of Kasha's law, $\theta_{IC}^T$ will generally lie only very slightly less than unity, i.e. easily greater than 0.9. $f_{opt.} = c/\lambda$, is the frequency of the pump light (c is the speed of light in a vacuum) where $\lambda$ is the vacuum wavelength of the same. $f_{mas.}$ is the frequency of the maser transition. $\Delta f_{mas.} \equiv 1/(\pi T_2^{\text{mas.}})$ is the characteristic line width of the maser transition. $\gamma = -g_J \mu_B/\hbar$ is the inverse gyromagnetic ratio ($g_J$ is the Landé g-factor, $\mu_B$ is the Bohr magneton and $\hbar$ is Planck's constant divided by $2\pi$) and $\gamma/2\pi$ approximately equals 2.8 MHz per gauss.

$\Lambda \equiv \sqrt{\mu_0 Q_{mas.}^{\text{loaded}}/(\pi f_{mas.} V_{mas.}^{\text{mag.}})}$ is the so-called field-power conversion ratio/factor or, synonymously, the (resonator) efficiency parameter, and is typically reported in units of gauss per root watt; here $\mu_0 \equiv 4\pi \times 10^{-7}$ H m$^{-1}$ is the permeability of a vacuum and $Q_{mas.}^{\text{loaded}}$ is the loaded quality factor of the maser mode and $V_{mas.}^{\text{mag.}}$ is the magnetic mode volume of same; $\Lambda$ is considered and calculated for different types of resonator in Twig, Y., Suhovoy, E. & Blank, "Sensitive surface loop-gap microresonators for electron spin resonance", A., Rev. Sci. Instrum. 81, 104703 (2010); as well as in Blank, A., Stavitski, E., Levanon, H. & Gubaydullin, F. "Transparent miniature dielectric resonator for electron paramagnetic resonance experiments". Rev. Sci. Instrum. 74, 2853-2859 (2003). In passing, it is noted that $\Lambda$ is extremely important in EPR spectroscopy, as is explained in Höfer, P. in "Electron Paramagnetic Resonance—A Practioner's Toolkit" (eds. Brustolon, M. & Giamello, E.) (2009). It determines the sensitivity of an EPR measurement for a given applied microwave power; also in passing, it is pointed out that $$\Lambda^2 \equiv \frac{4\pi}{3c^3} f_{mas.}^2 F_{Purcell}^{\text{mag.}},$$

where $F_{Purcell}^{\text{mag.}}$ is the maser mode's magnetic Purcell factor.

$\sigma_{mas.}^2$ is the effective normalized transition probability matrix element squared for stimulated emission of the maser transition. This dimensionless quantity depends on the polarization of the magnetic field of the maser mode with respect to the orientation or orientations of the dye molecules. As stated in Table 5-1 of Microwave Solid-State Masers by A. E. Siegman, where the text preceding this table outlines the calculation required for the more general case, $\sigma^2 = 1$ for a circularly polarized maser mode with all dye molecules ideally oriented, and $\sigma^2 = \frac{1}{2}$ for a linearly polarized maser mode with all dye molecules ideally oriented. By "effective" it is meant here that the value of $\sigma_{mas.}^2$ takes into account how the dye molecules are actually oriented in the material. In the case of a crystalline masing material, dye molecules may occupy several differently oriented sites, with $\sigma_{mas.}^2$ being the discrete weighted average over the normalized transition probability for each orientation with reference to the polarization of the magnetic field of the maser mode. In the case of polycrystalline, glassy, amorphous of liquid materials, a weighted average over all orientations is evaluated, with the weighting function reflecting the material's residual grain, texture or other form of anisotropy. The value of $\sigma_{mas.}^2$ should also take into account that fact that the polarization of the magnetic field of the maser mode itself may vary as a function of position over the optically pumped maser material, with a suitable spatial average taken.

With regard to equation (2) in the definition of the effective relaxation time, $T_1^{\text{eff.}}$, $p_L^{ISC}$ $p_U^{ISC}$ denote the normalized population rates into the lower and upper maser levels within the molecule's triplet ground state as mediated by intersystem crossing, respectively. $\tau_L$, $\tau_U$ denote the decay rate from the lower and upper maser levels within the molecules triplet ground state, and $\tau_A$ denotes the decay rate from the remaining sublevel of the triplet state's three sublevel. This sublevel can conveniently be described as the auxiliary level.

$T_1^{\text{mas.}}$ denotes the spin-lattice relaxation time of the maser transition; whereas $T_1^{\text{rep.}}$ denotes the spin-lattice relaxation time of the transition that connects the lower maser level to the auxiliary level, where this transition shall henceforth be known as the repumper transition. $T_1^{\text{idl.}}$ denotes the spin-lattice relaxation time of the transition that connects the upper maser level to the auxiliary level. This transition can conveniently be referred to as the idler transition.

The value of $T_1^{eff.}$ equates to the steady-state population inversion, that is the expected number of dye molecules in the upper maser level minus the expected number of dye molecules in the lower maser level, for a constant rate of one intersystem crossing per second into the triplet manifold.

It should be is noted that the denominator of $T_1^{eff.}$ as defined above is a positive-definite quantity. The inventor has found that the problem of bottlenecking in the lower maser level is avoided if the numerator of $T_1^{eff.}$ is greater than zero, that is if the properties of the dye molecule (or other maser molecule) within the masing material satisfies the following condition:

$$\kappa \equiv p_U^{ISC}\{1 + \tau_U[1/\tau_A + 1/\tau_L + T_1^{rep.}/(\tau_A\tau_L)]\} - \quad (3)$$
$$p_L^{ISC}T_1^{rep.}\{1/\tau_A + 1/T_1^{idl.}[1 + \tau_U(1/\tau_A + 1/\tau_L)]\} +$$
$$(\tau_U/\tau_L)(T_1^{rep.}/T_1^{idl.}) - 1 > 0.$$

This criterion is a necessary but not sufficient for continuous, above threshold, maser operation. Inequality (3) above provides a criterion for selecting suitable masing materials, where κ is a figure of merit which must exceed zero for such operation to be viable. Techniques that are standard in the art of pulsed electron paramagnetic resonance (EPR) spectroscopy can be used to determine all of the properties that appear on the left hand side of inequality (3), and hence the value of κ as a function of temperature, dye concentration (or concentration of other maser material), and other experimental parameters.

Furthermore, the inventor has found that any maser assembly satisfying the whole inequality (1) above is capable of continuous above-threshold maser operation.

The form of inequality (1) immediately implies that it is advantageous with respect to attaining and/or exceeding maser threshold for every one of $\Theta_{ISC}^{eff.}$, $T_1^{eff.}$, $T_2^{mas.}$, $\sigma_{mas.}^2$, $\Lambda^2$, $\kappa_{opt.}$, and $P_{opt.}$ to be positive and as large as possible.

Here the parameters $\Theta_{ISC}^{eff.}$, $T_1^{eff.}$, $T_2^{mas.}$ are again properties of the masing material, whereas $\sigma^2_{mas.}$, $\Lambda^2$ and $\kappa_{opt.}$, $P_{opt.}$, and are engineering parameters relating to the electromagnetic and optical conditions, respectively, under which the masing material is worked. Again, techniques that are standard in the art of pulsed electron paramagnetic resonance (EPR) spectroscopy can again be used to determine the values of $\Theta_{ISC}^{eff.}$, $T_1^{eff.}$, $T_2^{mas.}$. The effective quantum matrix element squared $\sigma_{mas.}^2$ depends on how the dye molecules within the material are oriented with respect to the magnetic field of the maser mode and on the polarization of same. This can be determined by electromagnetic modelling or else deduced experimentally.

The overall optical coupling parameter $\kappa_{opt.}$ depends on the optical absorption and scattering properties of the maser material and on its shape, dimension, and orientation with respect to the size, polarization, orientation and wavelength of the pump beam supplied by the optical pump source. This can be determined by optical modelling or else inferred experimentally.

The satisfaction of inequality (1) permits trade-offs.

For example, a maser assembly incorporating a masing material that only just avoids bottlenecking in the lower maser level so exhibiting a positive yet disadvantageously small value or $T_1^{eff.}$ can nevertheless be lifted about threshold by using an electromagnetic structure offering an advantageously large conversion factor $\Lambda$. Equation (1) determines how large $\Lambda$ would need to be to achieve this for a given $T_1^{eff.}$.

For example, the use of a polycrystalline or liquid host matrix may suppress either $\sigma_{mas.}^2$ or $\kappa_{opt.}$ because, in such a host, the dye molecules may not all be advantageously aligned to both absorb photons from the pump light and thereupon be stimulated into emission by oscillating magnetic field of the maser mode. The polycrystallinity or liquidity of a host matrix may also adversely affect the values of the time constants that control the spin dynamics of the dye molecules. It may nevertheless be possible to attain threshold with a polycrystalline or liquid host by using an electromagnetic structure affording a high $\Lambda$, or by pumping with a powerful pump light source, or both. It is here also noted that, in the work presented by Lang, J., Sloop, D. J. & Lin, T.-S. in "Orientational anisotropic studies by field rotation technique: Near zero-field pulsed EPR experiments of pentacene in p-terphenyl"; Journal of Magnetic Resonance 176, 249-256 (2005), the transition line width $\Delta f_{mas.} \equiv 1/(\pi T_2^{mas.})$ for a monocrystalline of pentacene doped p-terphenyl was found to be around 40 percent smaller than that for a packed-powder sample of the same.

Many otherwise advantageous masing-material structures do not satisfy equation (3), or else they do satisfy it but their values of $\Theta_{ISC}^{eff.} \times T_1^{eff.} \times T_2^{mas.}$ are so low as to make satisfying the maser threshold inequality (1) in turn extremely difficult. Even so, a number of particularly advantageous chemistries (material constitutions) do satisfy inequality (1).

It will thus be apparent to the skilled person having regard to the teachings above that one can avoid bottlenecking and exceed maser threshold by doing/choosing everything right in the first place: pick an advantageous masing molecular species in an advantageous host matrix within an electromagnetic support structure of a high conversion factor, and excite it with a powerful pump. The formula explicitly defines the border between those many assemblies that will not mase continuously and those judiciously chosen assemblies that will. The avoidance of bottlenecking is necessary but not sufficient to exceed maser threshold. If is worth pointing out here that bottlenecking alone can be avoided by chosing a dye molecule exhibiting high rates of spin-lattice relaxation relative to its sublevel decays rate from. But doing so will suppress $T_1^{eff.}$ so making it harder to attain maser threshold, i.e. to satisfy (1). Advantageous dye molecules exhibit low rates of spin-lattice relaxation, but where yet the decay rate of the upper maser level is not hugely greater than that of the lower maser level. This enables bottlenecking to be avoided whilst maintaining a high $T_1^{eff.}$.

Referring now to the drawings, FIG. 1 shows a Jablonski energy-level diagram for the maser schemes described in this patent application in the specific case where ISC crossing occurs predominantly from the first excited state, $S_1$. The invention taught herein also covers the same schemes but where the where the ISC crossing occurs predominantly from one of any of the higher-excited singlet states $S_{n \geq 2}$, where n is an integer.

It goes beyond FIG. 1 of RTSSM in the following respects:
 (A) it covers optical excitation by non-monochromatic, shorter wavelength light sources that excite dye molecules into various higher singlet states and their subsequent internal conversions down to either the first-excited singlet state $S_1$ or to a high-excited singlet state $S_{n \geq 2}$ (B) it covers resonant intersystem crossing from $S_1$ or $S_{n\geq 2}$ into first a higher triplet state and thereupon internal conversion down to the triplet ground state $T_1$ and (C) it covers repumping.

With reference to FIG. 1, a maser material, which in one embodiment is a dye containing crystal of suitable material (for which see examples given below), will normally be at ground state 10. When optical light is pumped from a source 1, for instance a laser diode, an LED or other suitable source, the molecules of the maser material are excited 2 to singlet states 5 by photons of different wavelengths 3, 4. Irrespective of where on the ladder of excited states the molecule is photoexcited, it will rapidly (typically within a few picoseconds) decay by internal conversion 8 into the singlet first excited state $S_1$. Some of the excited molecules will decay non-radiatively 6 back to the ground state. Others will fluoresce 7 back down to same. The remainder, and advantageously the vast majority, will undergo intersystem crossing 9 into a particular triplet states $T_N$ within the ladder of triplet states 12. The molecule will then rapidly (again typically within just a few picoseconds) decay by internal conversion to the triplet ground state $T_1$.

This state comprises an U(pper) Maser 18, an Auxiliary 17 and a Lower Maser 16 sublevels with a maser transition 21 between the upper 18 and lower 16 maser levels, and an idler transition between the upper maser level 18 and the auxiliary level 17, and a repumper transition 20 between the auxiliary 17 and lower maser 16 levels.

Molecules in the upper maser, auxiliary and lower maser levels can decay back to the singlet ground state 10 via reverse intersystem crossing decay processes 23, 24 and 22, respectively. The process of intersystem crossing 9 followed by rapid internal conversion 11 leads to the upper maser, auxiliary and lower maser levels being populated with molecules at different rates 15, 14, 13, respectively, and the combined process leads to more molecules occupying the upper maser level than the lower maser level. Stimulated emission by the maser mode 31 (in FIG. 3) exploiting this population inversion produces a maser output 25. By stimulated absorption from a repumping drive input 26, molecules can be subsequently repumped out of the lower maser level into the auxiliary level 17 and subsequently decay 24 back more quickly to the singlet ground state 10.

Figure 2:
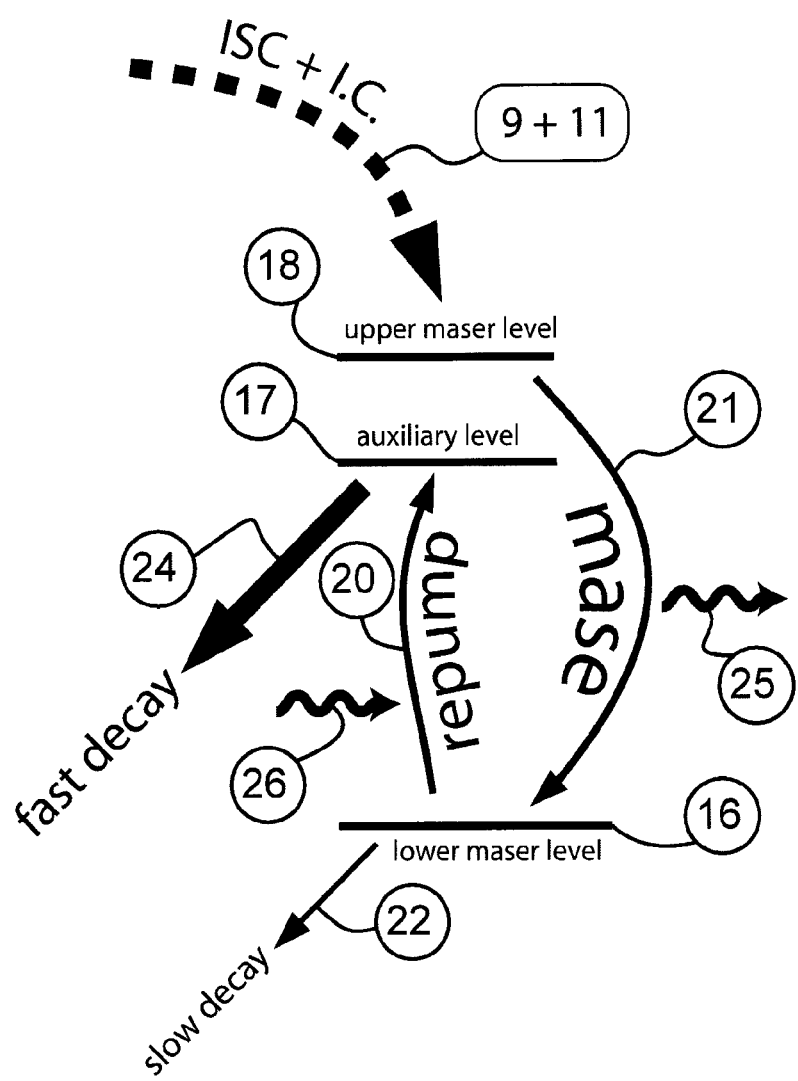
FIG. 2 shows the state trajectory of a dye molecule that mases then is repumped.
Figure 3:
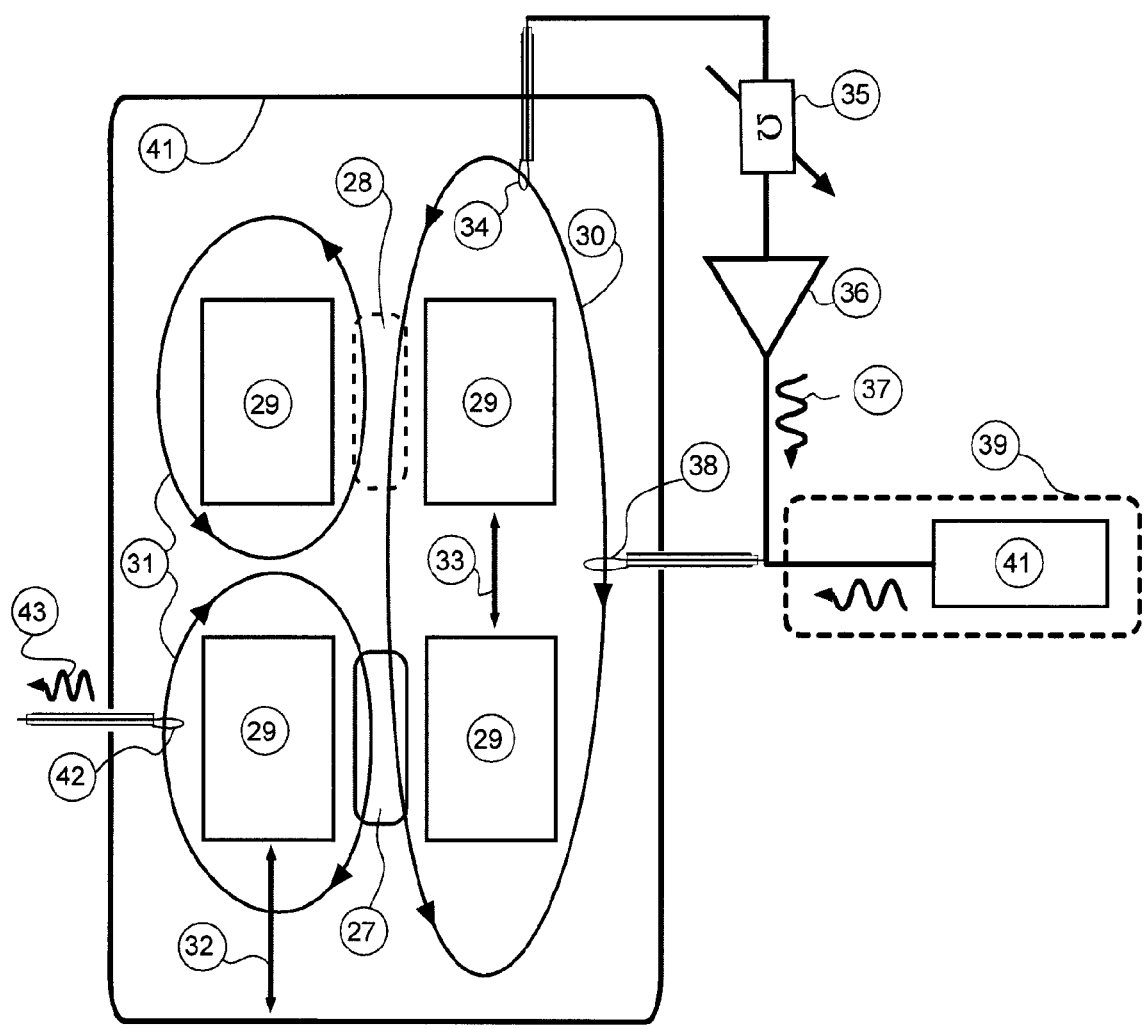
FIG. 3 depicts an embodiment of a maser assembly incorporating a dual-mode electromagnetic structure suitable for the implementation of repumping.

FIG. 2 depicts the primary elements of repumping. A dye molecule arrives in the upper maser level 18 by way of intersystem crossing 9 and internal conversion 11. It mases, 21, thereby depositing an extra photon 25 into the maser mode 31 (in FIG. 3) and itself landing in the lower maser level 16. Because decay 22 out of the lower maser level is slow, the molecule naturally loiters in this level for a relatively long time causing a build-up on population in the lower maser level so causing unwanted absorption of the maser mode. Instead, the molecule can be repumped 20 by forced excitation 26 of the repumper mode 30 (FIG. 3). On arriving at the auxiliary level 17 it more rapidly decays back to the singlet ground state 10 via a relatively fast reverse intersystem crossing process 24.

FIG. 3 depicts the anatomy of a maser assembly for the implementation of repumping. The dielectric rings 29 and metal can 44 in this assembly exhibit cylindrical symmetry. Here the frequencies of the repumper mode 30 and the maser mode 31 can be adjusted to be resonant with their respective transitions by adjusting the distance 33 between the dielectric rings and the distance 32 between the rings and the roof, floor or sidewalls of the enclosing cavity 44. For clarity, the means by which the masing material 27, and advantageously 28, is optically pumped is not depicted. "Outside in" optical pumping like the means of optical pumping shown in FIG. 2 or RTSSM is one of several alternatives, provided that the dielectric 29, which functions as a magnetic flux concentrator, is substantially transparent to pump light (or else a small radial hole is drilled through it to provide a suitable light path with minimal effect on the electromagnetic structure).

The energization of the repumper mode and thereupon the saturation of the repumper transition, is provided either by a loop oscillator 34-38, with a mode-selector filter 35 tuned to the same, where 36 is a sufficiently powerful microwave amplifier of a standard design. In other embodiments 39, the energization can be achieved directly, though at greater cost in hardware, by injecting a tone 40 at the frequency of the repumper mode from a sufficiently powerful frequency-tunable microwave synthesizer 41 via the repumper excitation coupling port 38. In general, it is advantageous for this port to lie at a node of the maser mode. Here the maser assembly is configured as an oscillator like in RTSSM, where a maser oscillation output 43 is harvested from a port 42 that couples to the maser mode 31. In FIG. 3, like in FIG. 2 of RTSSM, the maser is configured as an oscillator, the difference being that the repumping means displayed in the current FIG. 3 facilitates continuous as opposed to merely pulsed oscillation.

Figure 4:
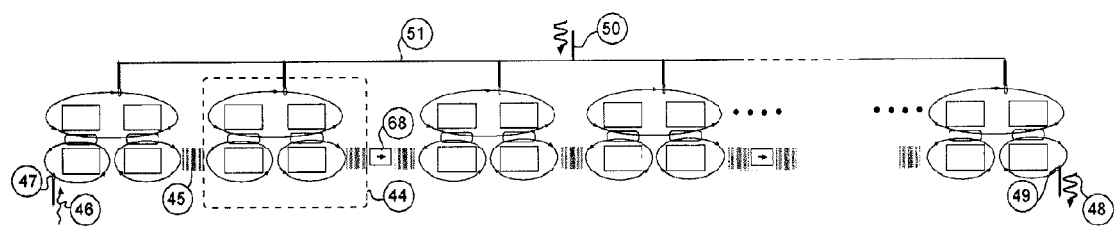
FIG. 4 depicts the geometry of a slow-travelling-wave maser amplifier that implements repumping.

FIG. 4 depicts the structure of an embodiment arranged as a slow-travelling-wave maser amplifier that implements repumping. This structure may be viewed as a sequence of the dual-mode resonator structures 44 shown in FIG. 3 electromagnetically coupled 45 end-to-end so as to form a slow waveguide or band pass filter. An electromagnetic signal 46 is injected into the maser mode by means of an input coupler 47 and an amplified version of this signal 48 is outputted from a second coupler 49 at the other end of the waveguide. Advantageously, low noise isolators 68 are inserted at intervals along the structure to ensure that the assembly amplifiers only from input to output (i.e. from left to right). Repumping microwave excitation 50 is distributed via a bus 51 along the structure.

Figure 5:
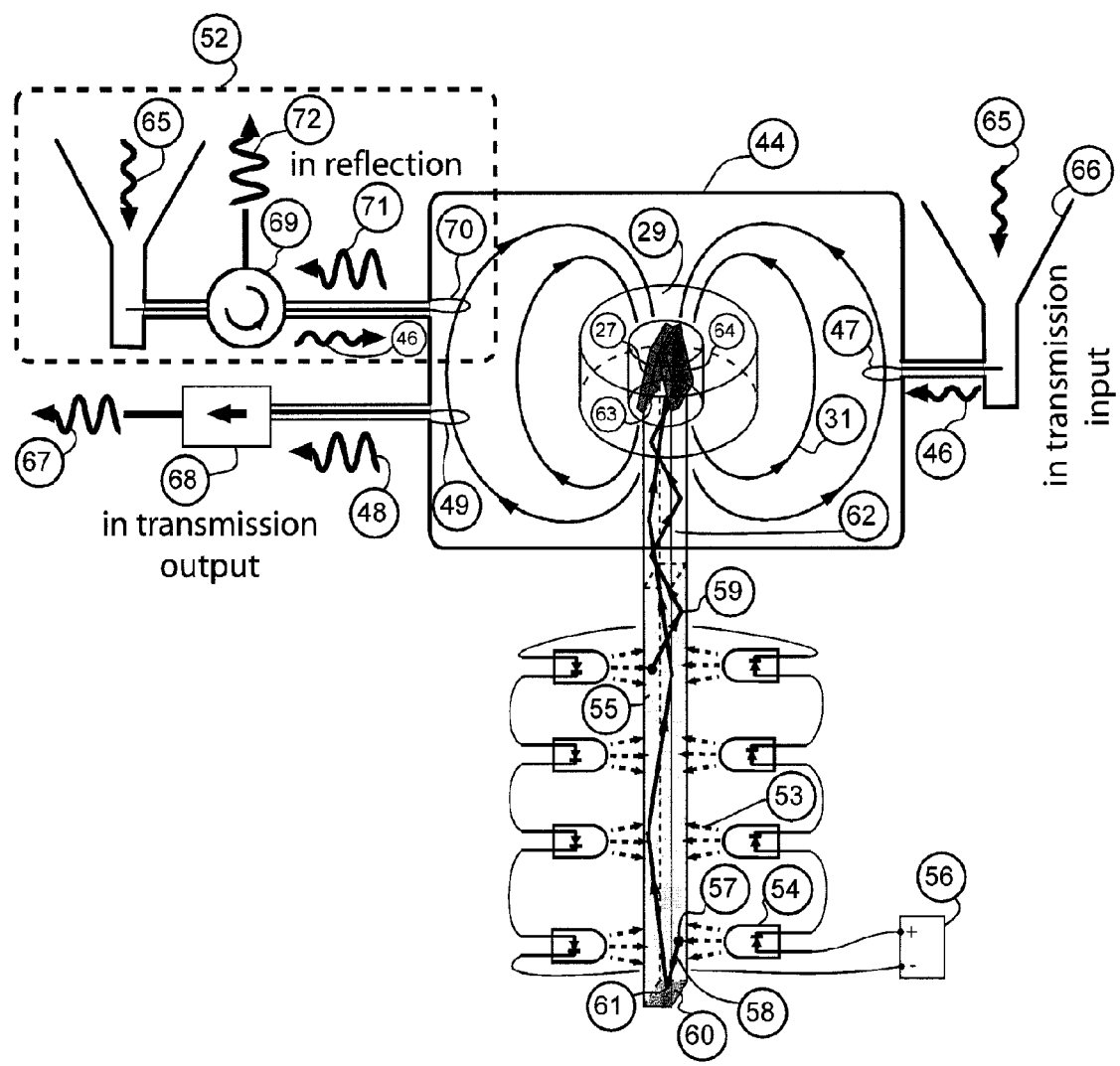
FIG. 5 depicts an embodiment of a fluorescence concentrator pump light source together with configurations corresponding to one port ("in reflection") and two-port ("in transmission") maser amplifiers.

FIG. 5 depicts an embodiment of a maser assembly configured as an amplifier "in transmission" and which contains a fluorescence concentrator pump light source. Optionally, its configuration 52 as an amplifier in reflection is also shown. "Royal blue" light 53 at approx 460 nm from powerful, high efficiency LEDs 54 such as X-lamp XT-E Royal Blue LEDs currently made by Cree Corp., enters a fluorescence concentrator 55 in the form of a rectangular prism of cerium doped yttrium aluminium garnet, that is of Ce:YAG. These LEDs are powered from a current controlled power supply 56. This material absorbs the photons of blue light 57 and within a few nanoseconds re-emits 58 each absorbed photon at a predominantly green and yellow wavelengths centred around 515 nm in all directions. As is revealed for example by FIG. 3.5 on page 30 of Iinuma, M, Doctoral Thesis, Dynamic Nuclear Polarization at High Temperature for Polarized Proton Target, Department of Physics (Kyoto University, 1997), pentacene:p-terphenyl is known to absorb strongly in the green and yellow, but not in the blue.

Due to the YAG;s high refractive index (approximately 1.83 @ 589 nm; it depends slightly on wavelength) with respect to that of the air surrounding it, the prismatic geometry of the concentrator serves to guide the majority of the fluorescence light towards the end of the prism by total internal reflection 59. Since the bottom end of the concentrator is covered by a metallic mirror 60, fluorescence light is reflected 61 therefrom and the only escape route for the bulk of the fluorescence light is out through the concentrator's upper end, and so along and up the undoped prismatic YAG waveguide 62, across the angular facets of the terminating wedge 63 and thereupon absorbed 64 in slabs of the masing material 27. LEDs having a high wall-plug efficiency, the fluorescence yield in YAG:Ce is close to unity, and the refractive index of YAG is high. Such a fluorescence concentrator can thus provide an affordable, efficient, and high luminance source of pump light for pentacene:p-terphenyl and many other reddish-looking aromatic dye:host systems that absorb strongly in the green and yellow frequency ranges. Difference fluorophores in different transparent, high refractive index materials would be suitable for different maser materials and different wavelengths of primary light source.

Configured to amplify in transmission: weak electromagnetic radiation 65 is collected by an antenna 66 whose output is injected 46 into the assembly's maser mode 31 by way of a coupler 47. The signal is amplifier by maser action and extracted 48 by way of a second coupler 49 to provide a useful amplified output signal 67. Advantageously, to prevent noise from the output being injected into the maser mode and amplified up, a low-noise isolator 68 is installed at the assembly's output.

The arrangement could also or in the alternative be configured to amplify in reflection: The weak signal 46 to be amplified is fed to the input coupler 70 by way of a circulator 69. This same coupler 70 serves to harvest an amplified version 71 of the input signal travelling in the opposite direction. The circulator 69 serves to direct the latter to the output 72. In this arrangement, the isolation of the circulator must be sufficient to avoid injecting thermal noise from the output into the maser amplifier's input.

Table 1 below shows the maser-relevant parameters for a number of materials which may be used with the apparatus and method disclosed herein. The skilled person will understand that the teachings herein provide the parameters and characteristics sought for a suitable material and that as a result the skilled person will be able to identify other suitable compounds and molecules using these teachings.

TABLE 1

| | symbol | unit | pentacene in p-terphenyl (single crystal) | perdeuterated pentacene ($-d_{14}$) in p-terphenyl (single crystal) | tetraphenyl porphyrin in n-octane or E7 liquid crystal @100 K | acridene ($-d_9$) in fluorene ($-d_8h_2$) | phenazine in fluorene @220 K | tetracene in p-terphenyl |
|---|---|---|---|---|---|---|---|---|
| typical pump wavelength | $\lambda_{pump}$ | nm | 590 | 590 | 640 | 373 or 356 or 339, or 323 | 437 | ~497 |
| intersystem crossing yield | $\Theta_{ISC}$ | % | 62.5 | 62.5 | 87 | 0.37 competing against heteroexcimer | 0.15 competing against heteroexcimer | unknown |
| fraction populating X sublevel of triplet | $p_X^{ISC}$ | | 0.76 | 0.76 | 0.56 | 0.906 | ~1 | 0.34 |
| fraction populating Y sublevel of triplet | $p_Y^{ISC}$ | | 0.14 | 0.14 | 0.33 | 0.058 | ~0 | 0.55 |
| fraction populating Z sublevel of triplet | $p_Z^{ISC}$ | | 0.10 | 0.10 | 0.11 | 0.036 | ~0 | 0.11 |
| zero-field splitting (ZFS) parameters: | D | MHz | 1395 | 1396 | 115 | 2209.8 | 2200 | 1652 |
| | E | MHz | 53.5 | 53.4 | 240 | −261.6 | −32.1 | 126 |
| linewidth of maser transition | $1/(\pi T_2)$ | MHz | 0.7 | 0.4 | 22 | 20 [$-d_9/-d_8h_2$] | 22 | 10 |
| typical spin-lattice decay rate | $W = 1/T_1$ | $\times 10^3$ s$^{-1}$ | 80 | 80 | 3.3 | 130 | ~200 | 20 |
| decay rate (=1/lifetime) of X triplet sublevel | $k_X \equiv 1/\tau_X$ | $\times 10^3$ s$^{-1}$ | 97 | 41 | 0.63 | 3.3 | 1.43 | unknown |
| decay rate (=1/lifetime) of Y triplet sublevel | $k_Y \equiv 1/\tau_Y$ | $\times 10^3$ s$^{-1}$ | 64 | 58 | 0.30 | 3.3 | 0.6 | unknown |
| decay rate (=1/lifetime) of Z triplet sublevel | $k_Z \equiv 1/\tau_Z$ | $\times 10^3$ s$^{-1}$ | 11 | 19 | 0.14 | 3.3 | 0.06 | unknown |
| parameter required to exceed zero to avoid maser self-termination under hard repumping: | $\kappa\|_{rep}^{sat.}$ | | 0.35 | 1.2 | −0.05 | 1.7 | 0.46 | |
| maser figure or merit under hard repumping: | $\Theta_{ISC} T_1^{eff}\|_{rep}^{sat.}$ | $\times 10^{-6}$ s | 0.61 | 1.38 | self-terminating | 0.81 | 0.12 | |
| parameter required to exceed zero to avoid maser self-termination without | $\kappa$ | | 0.20 | 1.5 | −0.012 | 2.63 | 0.50 | |

TABLE 1-continued

| symbol | unit | pentacene in p-terphenyl (single crystal) | perdeuterated pentacene ($-d_{14}$) in p-terphenyl (single crystal) | tetraphenyl porphyrin in n-octane or E7 liquid crystal @100 K | acridene ($-d_9$) in fluorene ($-d_8h_2$) | phenazine in fluorene @220 K | tetracene in p-terphenyl |
|---|---|---|---|---|---|---|---|
| repumping: maser figure of merit without repumping: | $\Theta_{ISC} T_1^{eff.}$ ×$10^{-6}$ s | 0.28 | 1.06 | self-terminating | 0.82 | 0.09 | |

Table 1 illustrates those properties relevant to maser action for: pentacene in p-terphenyl (single crystal), perdeuterated pentacene (-d14) in p-terphenyl (single crystal), tetraphenyl porphyrin (H2TPP) in n-octane @100 K (poly-crystalline), acridene(-d9) in fluorene(-d8h2) (single crystal), and phenazine in fluorence at 220K and tetracene in p-terphenyl at room temperature. The properties of [6,6]-phenyl C61 butyric acid methyl ester (PCBM) in a polystyrene matrix are not provided since such a system provides no population inversion across a microwave-frequency transition in zero magnetic field.

Perdeuterated pentacene in p-terphenyl seems the most advantageous of the materials compared.

TABLE 2

| quantity | Symbol | typical value [unit] |
|---|---|---|
| matrix element squared | $\sigma_{mas.}^2$ | 0.5 |
| pump light optical coupling efficiency | $k_{opt.}$ | 0.75 |
| intersystem crossing yield | $\Theta_{ISC}^{eff.}$ | 0.75 |
| maser transition frequency | $f_{mas.}$ | 1.5 [GHz] |
| optical pump frequency | $f_{opt.}$ | 500 [THz] |
| effective relaxation time of steady-state maser spin dynamics | $T_1^{eff.}$ | 2 [µS] |
| line width of maser transition | $\Delta_{FWHM} \equiv 1/(\pi T_2^{mas.})$ | 0.5 [MHz] |
| conversion factor of microwave resonator or waveguide | $\Lambda$ | 10 [G/√W—gauss per root watt] |

Table 2 above shows typical values for all key parameters. Upon evaluating the left-hand-side of (1), the threshold power for CW masing is estimated to be 60 watts.

Though considerable, the generation of such power is perfectly possible using modern, high efficiency light sources. The removal of this power is also feasible through conventional heat-removal means such as the incorporation of a thermal substrate exhibiting high thermal conductivity, the use of either passive or forced air cooling, the use of either passive or forced liquid cooling, or the incorporation of heat pipes. With regard to heat removal, it is advantageous for the masing material to itself exhibit a reasonably high thermal conductivity and for the material to be in the form of a plate, or a scroll, or any other shape offering a high surface area-to-volume ratio such that every active region of the masing material lies close to a cold face or a cooling liquid/gas. These cooling means are well-known in the arts of solid-state laser design, power transistor design, computer CPU design, or in the design of any compact device or engine requiring the removal of considerable waste heat. They shall thus not be further expanded upon here.

The teachings herein also contemplate a room-temperature maser incorporating a masing material in the form of a viscous liquid or a liquid crystal that contains dye molecules capable of being pumped along the lines as considered here, in not inconceivable. Such a "liquid-state" maser would offer advantages with respect to keeping the gain medium at a constant temperature. Liquid gain medium that has been heated up on account of being exposed to the (necessarily intense) optical pump can be piped away to be with replaced with cooled but otherwise identical liquid gain medium, with the heated up medium recycled and cooled by way of a chiller in a closed-loop system. One cannot do this trick so easily with a solid gain medium.

In some embodiments it is possible, by aerating and so introducing oxygen into a solution of PCBM in toluene, to reduce the lifetime of the triplet state of the PCBM dissolved therein by a factor of several or more. Well-known triplet-quenching molecules, such as cycloheptatriene and cyclooctatetraene (COT), could similarly be used in the art of optically pumped triplet-state masers to reduce the lifetime of either all three or a subset of the triplet-state sublevels so making the satisfaction of inequalities (1) (3) and/or (6) less difficult.

All optional and preferred features and modifications of the described embodiments and dependent claims are usable in all aspects of the invention taught herein. Furthermore, the individual features of the dependent claims, as well as all optional and preferred features and modifications of the described embodiments are combinable and interchangeable with one another.

The disclosures in British patent application number 1214720.3, from which this application claims priority, and in the abstract accompanying this application are incorporated herein by reference.

The invention claimed is:

1. A maser assembly including:
   a pump light source;
   a maser material including molecules that are excited through the absorption of light from the pump light source, and which subsequently transfer via intersystem crossing (ISC) into the sublevels of their triplet ground states, so causing a population inversion between two sublevels of their triplet ground states, the said two sublevels being an upper maser level and a lower maser level and the remaining sublevel being an auxiliary level;
   an electromagnetic structure in which the masing material is disposed, and which supports a microwave mode that is both resonant in frequency with and magnetically coupled to the transition between the upper and lower maser levels, this transition being a maser transition;
   and where energy is supplied to the microwave mode through stimulated emission across the maser transition at such a rate as to exceed the mode's electromagnetic losses, the microwave mode being a maser mode;
   where the maser assembly is characterized by satisfying $$\eta \equiv \frac{1}{2} P_{opt.} \kappa_{opt} \Theta_{ISC}^{eff.} \frac{f_{mas.}}{f_{opt.}} T_1^{eff.} T_2^{mas.} \gamma^2 \sigma_{mas.}^2 \Lambda^2 > 1, \quad (1)$$

where $$T_1^{eff.} \equiv \frac{\begin{bmatrix} p_U^{ISC}\{1 + \tau_U[1/\tau_A + 1/\tau_L + T_1^{rep.}/(\tau_A\ \tau_L)]\} - \\ p_L^{ISC} T_1^{rep.}\{1/\tau_A + 1/T_1^{idl.}[1 + \tau_U(1/\tau_A + 1/\tau_L)]\} + \\ (\tau_U/\tau_L)(T_1^{rep.}/T_1^{idl.}) - 1 \end{bmatrix}}{\begin{bmatrix} (1/\tau_A + 1/\tau_L) + (1/T_1^{idl.} + 1/T_1^{mas.}) + \\ \tau_U(1/T_1^{idl.} + 1/T_1^{mas.})(1/\tau_A + 1/\tau_L) + \\ T_1^{rep.}\{(1/\tau_A + 1/T_1^{idl.})(1/\tau_L + 1/T_1^{mas.}) + \\ T_U[1/(\tau_A\ \tau_L)(1/T_1^{idl} + 1/T_1^{mas.}) + \\ 1/(T_1^{idl.}\ T_1^{mas.})(1/\tau_A + 1/\tau_L)]\} \end{bmatrix}}, \quad (2)$$

where:

$P_{opt.}$ is the optical power of light supplied by the pump light source;

$\kappa_{opt.}$ is the overall optical efficiency associated with the conveyance into and subsequent absorption by the maser material of light from the pump light source;

$\Theta_{ISC}^{eff.} \equiv \theta_{IC}^S \Theta_{ISC} \theta_{IC}^T$, where $\theta_{IC}^S$ is the probability of a molecule, upon being photo excited by the pump light into one or other of its singlet states, arriving at the lowest excited singlet state $S_1$;

$\Theta_{ISC}$ is the intersystem-crossing (ISC) yield between $S_1$ and a triplet state of the molecule;

$\theta_{IC}^T$ is the probability of the molecule reaching its triplet ground state $T_1$ upon having intersystem crossed into a triplet state;

$f_{opt.} = c/\lambda$, is the frequency of the pump light where $\lambda$ is the vacuum wavelength of the same;

$f_{mas.}$ is the frequency of the maser transition;

$\Delta f_{mas.} \equiv 1/(\pi T_2^{mas.})$ is the characteristic line width of the maser transition;

$\gamma \equiv -g_J \mu_B/\hbar$ is the inverse gyromagnetic ratio;

$\Lambda \equiv \sqrt{\mu_0 Q_{mas.}^{loaded}/(\pi f_{mas.} V_{mas.}^{mag.})}$ is the so-called field-power conversion ratio/factor or, synonymously, the (resonator) efficiency parameter;

$Q_{mas.}^{loaded}$ is the loaded quality factor of the maser mode, $V_{mas.}^{mag.}$ is the magnetic mode volume of same and $\mu_0$ is the permeability of a vacuum;

$\sigma_{mas.}^2$ is the effective normalized transition probability matrix element squared for stimulated emission of the maser transition;

$P_L^{ISC}$, $P_U^{ISC}$ denote the normalized population rates into the lower and upper maser levels, respectively, of the molecule's triplet ground state, as is mediated by intersystem crossing;

$1/\tau_L$, $1/\tau_U$ denote decay rates out of the lower and upper maser levels, respectively, back to a ground state, and $1/\tau_A$ denotes a decay rate out of the auxiliary level back to the ground state;

$T_1^{mas.}$ denotes the spin-lattice relaxation time of the maser transition;

$T_1^{rep.}$ denotes the spin-lattice relaxation time of the transition that connects the lower maser level to the auxiliary level;

$T_1^{idl.}$ denotes the spin-lattice relaxation time of the transition that connects the upper maser level to the auxiliary level.

2. A maser assembly according to claim 1, wherein the pump light source includes an optical guide for conveying this light to the maser material.

3. A maser assembly according to claim 1, wherein the maser material is a substance containing dye molecules.

4. A maser assembly according to claim 1, wherein the electromagnetic structure, which supports the microwave mode, is such that electromagnetic energy in the microwave mode can be amplified through stimulated emission across the maser transition.

5. A maser assembly according to 1, wherein the maser material is characterized by having or including molecules which are completely or partially deuterated.

6. A maser assembly according to claim 5, wherein the maser material includes dye molecules, the dye molecules being completely or partially deuterated.

7. A maser assembly according to claim 5, including a material host medium in which the maser material is dissolved, the host medium being completely or partially deuterated.

8. A maser assembly according to claim 5, wherein a subset of the hydrogen atoms in the dye and/or host molecules within the masing material are replaced with deuterium.

9. A maser assembly according to claim 1, including a second microwave mode, supported by the electromagnetic structure; said second microwave mode being operable to transfer molecules from the lower maser level to the auxiliary level, wherein the decay rate out of the auxiliary level back to the ground state is greater than the decay rate out of the lower maser level back to the ground state.

10. A maser assembly according to claim 1, wherein the first excited singlet state of molecules within the maser material are approximately resonant in energy with one of the same molecules' excited triplet states.

11. A maser assembly according to claim 1, wherein the pump light source includes a fluorescence concentrator.

12. A maser assembly according to claim 11, wherein fluorescing material of the fluorescence concentrator is pumped with light from a matched light source.

13. A maser assembly according to claim 12, wherein the light source includes one or several light-emitting diodes.

14. A maser assembly according to claim 12, wherein the spectral profile of the light generated by the process of fluorescence within the concentrator is substantially matched to the optical absorption spectrum of the maser material.

15. A maser assembly according to claim 12, wherein the pump light source assembly, is operable to emit royal blue light at around 460 nm.

16. A maser assembly according to claim 1, wherein the electromagnetic structure includes:
   a cavity with a single port connected to a circulator whose two other ports are an amplifier's input and output; or
   a cavity with two ports, advantageously incorporating a low-noise isolator on its output port directed away from the assembly, the other port being the input port; or
   a slow-wave transmission line with input and output couplers and advantageously incorporating several low-noise isolators distributed through the line and directed towards an output of an amplifier.

17. A maser assembly including:
   a pump light source;
   a maser material including molecules that are excited through the absorption of light from the pump light source, and which subsequently transfer via intersystem crossing (ISC) into the sublevels of their triplet ground states, so causing a population inversion between two sublevels of their triplet ground states;

an electromagnetic structure in which the masing material is disposed, and which supports a microwave mode that is both resonant in frequency with and magnetically coupled to the transition between said two sublevels; and where energy is supplied to the microwave mode through stimulated emission across the transition at such a rate as to exceed the mode's electromagnetic losses, the microwave mode being a maser mode;

wherein the maser material is characterized by having or including molecules which are completely or partially deuterated.

18. A maser assembly according to claim 17, wherein the maser material includes dye molecules, the dye molecules being completely or partially deuterated.

19. A maser assembly according to claim 17, including a material host medium in which the maser material is dissolved, the host medium being completely or partially deuterated.

20. A maser assembly according to claim 17, wherein a subset of the hydrogen atoms in a dye and/or host molecules within the masing material are replaced with deuterium.

21. A maser assembly including:
a pump light source;
a maser material including molecules that are excited through the absorption of light from the pump light source, and which subsequently transfer via intersystem crossing (ISC) into the sublevels of their triplet ground states, so causing a population inversion between two sublevels of their triplet ground states;
an electromagnetic structure in which the masing material is disposed, and which supports a microwave mode that is both resonant in frequency with and magnetically coupled to the transition between said two sublevels; and
where energy is supplied to the microwave mode through stimulated emission across the transition at such a rate as to exceed the mode's electromagnetic losses, the microwave mode being a maser mode;
characterized by a second microwave mode, supported by the electromagnetic structure; said second microwave mode being operable to transfer molecules from the lower excited level of the maser transition to an auxiliary level of the triplet state, wherein a decay rate out of the auxiliary level back to the ground state of the maser material is greater than a decay rate out of the lower excited maser level back to the ground state.

22. A maser assembly according to claim 21, wherein the maser material is characterized by having or including molecules which are completely or partially deuterated.

23. A maser assembly including:
a pump light source;
a maser material including molecules that are excited through the absorption of light from the pump light source, and which subsequently transfer via intersystem crossing (ISC) into the sublevels of their triplet ground states, so causing a population inversion between two sublevels of their triplet ground states;
an electromagnetic structure in which the masing material is disposed, and which supports a microwave mode that is both resonant in frequency with and magnetically coupled to the transition between said two sublevels; and
where energy is supplied to the microwave mode through stimulated emission across the transition at such a rate as to exceed the mode's electromagnetic losses, the microwave mode being a maser mode;
characterized by in that the pump light source includes a fluorescence concentrator.

24. A maser assembly according to claim 23, wherein the fluorescing material of the fluorescence concentrator is pumped with light from a matched light source.

25. A maser assembly according to claim 23, wherein the light source includes one or several light-emitting diodes.

26. A maser assembly according to claim 23, wherein the spectral profile of the light generated by the process of fluorescence within the concentrator is substantially matched to the optical absorption spectrum of the maser material.

27. A maser assembly according to claim 23, wherein the pump light source assembly, is operable to emit royal blue light at around 460 nm.

28. A maser assembly including:
a pump light source;
a maser material including molecules that are excited through the absorption of light from the pump light source, and which subsequently transfer via intersystem crossing (ISC) into the sublevels of their triplet ground states, so causing a population inversion between two sublevels of their triplet ground states;
an electromagnetic structure in which the masing material is disposed, and which supports a microwave mode that is both resonant in frequency with and magnetically coupled to the transition between said two sublevels; and
where energy is supplied to the microwave mode through stimulated emission across the transition at such a rate as to exceed the mode's electromagnetic losses, the microwave mode being a maser mode;
characterized in that the electromagnetic structure includes:
a cavity with a single port connected to a circulator whose two other ports are the amplifier's input and output;
a cavity with two ports, advantageously incorporating a low-noise isolator on its output port directed away from the assembly, the other port being the input port; or
a slow-wave transmission line with input and output couplers and advantageously incorporating several low-noise isolators distributed through the line and directed towards an output of the amplifier.

* * * * *

UNITED STATES PATENT AND TRADEMARK OFFICE
CERTIFICATE OF CORRECTION

PATENT NO. : 9,608,396 B2
APPLICATION NO. : 14/421954
DATED : March 28, 2017
INVENTOR(S) : Mark Oxborrow Page 1 of 1

It is certified that error appears in the above-identified patent and that said Letters Patent is hereby corrected as shown below:

In the Specification

Column 5, Line 13, after "respectively", delete "$\tau_L, \tau_u$" and replace with -- $1/\tau_L, 1/\tau_{U'}$ --.

Column 5, Line 14, after "and", delete "$\tau_A$" and replace with -- $1/\tau_A$ --.

Column 12, Line 56, after "respectively", delete "$\tau_L, \tau_u$" and replace with -- $1/\tau_L, 1/\tau_{U'}$ --.

Column 12, Line 58, after "and", delete "$\tau_A$" and replace with -- $1/\tau_A$ --.

Signed and Sealed this
Twenty-first Day of August, 2018

Andrei Iancu
*Director of the United States Patent and Trademark Office*